US009011245B2

(12) United States Patent
Visser

(10) Patent No.: US 9,011,245 B2
(45) Date of Patent: *Apr. 21, 2015

(54) METHOD OF GAMING, A GAMING SYSTEM, AND A GAME CONTROLLER

(75) Inventor: Antoon Christiaan Visser, Coogee (AU)

(73) Assignee: Aristocrat Technologies Australia Pty Limited, North Ryde (AU)

( * ) Notice: Subject to any disclaimer, the term of this patent is extended or adjusted under 35 U.S.C. 154(b) by 29 days.

This patent is subject to a terminal disclaimer.

(21) Appl. No.: 13/617,955

(22) Filed: Sep. 14, 2012

(65) Prior Publication Data

US 2013/0012316 A1 Jan. 10, 2013

Related U.S. Application Data

(63) Continuation of application No. 12/365,600, filed on Feb. 4, 2009, now Pat. No. 8,287,371.

(30) Foreign Application Priority Data

Feb. 4, 2008 (AU) ................................ 2008900492

(51) Int. Cl.

*A63F 9/24* (2006.01)
*A63F 13/00* (2014.01)
*G06F 17/00* (2006.01)

(Continued)

(52) U.S. Cl.

CPC ............ *G07F 17/32* (2013.01); *G07F 17/3211* (2013.01); *G07F 17/3213* (2013.01); *G07F 17/3244* (2013.01)

(58) Field of Classification Search

USPC ......................................... 463/20, 23, 25, 31

See application file for complete search history.

(56) References Cited

U.S. PATENT DOCUMENTS 4,017,077 A 4/1977 Burnside
5,344,145 A 9/1994 Chadwick et al.

(Continued)

FOREIGN PATENT DOCUMENTS

CA 2562324 4/2007
DE 3801501 8/1989

(Continued)

OTHER PUBLICATIONS

United States Patent and Trademark Office, "Notice of Allowance," issued in connection with U.S. Appl. No. 12/365,600, mailed on Jun. 18, 2012, 27 pages.

(Continued)

*Primary Examiner* — Steven J Hylinski

(74) *Attorney, Agent, or Firm* — Hanley, Flight and Zimmerman, LLC

(57) ABSTRACT

A method of gaming includes generating a game outcome. The method also includes determining whether the game outcome includes a win outcome. The method further includes providing a three-dimensional representation of an object having a plurality of win outcome modifiers thereon. Additionally, the method includes controlling display of the object in response to a modification condition being met, such that the object is displayed as rotating and the axis around which it rotates changes at least once prior to the object stopping and such that after stopping, the selected modifier of the plurality of modifiers which is to be applied is apparent from the display. The method includes modifying the win outcome with the selected modifier.

18 Claims, 11 Drawing Sheets

(51) Int. Cl.
*G06F 19/00* (2011.01)
*G07F 17/32* (2006.01)

(56) References Cited

U.S. PATENT DOCUMENTS

| | | | | |
|---|---|---|---|---|
| 5,492,325 | A | 2/1996 | Hawver | |
| 5,848,932 | A | 12/1998 | Adams | |
| 6,050,895 | A | 4/2000 | Luciano, Jr. et al. | |
| 6,059,658 | A | 5/2000 | Mangano et al. | |
| 6,120,377 | A * | 9/2000 | McGinnis et al. | 463/20 |
| 6,123,333 | A * | 9/2000 | McGinnis et al. | 273/146 |
| 6,142,880 | A | 11/2000 | Titus | |
| 6,224,483 | B1 | 5/2001 | Mayeroff | |
| 6,267,669 | B1 | 7/2001 | Luciano, Jr. et al. | |
| 6,582,307 | B2 | 6/2003 | Webb | |
| 6,715,756 | B2 | 4/2004 | Inoue | |
| 6,908,381 | B2 * | 6/2005 | Ellis | 463/13 |
| 7,153,207 | B2 * | 12/2006 | Kaminkow et al. | 463/20 |
| 7,204,754 | B2 * | 4/2007 | Gray et al. | 463/16 |
| 7,210,997 | B2 * | 5/2007 | Hughs-Baird et al. | 463/20 |
| 7,226,358 | B2 | 6/2007 | Miller et al. | |
| 7,309,285 | B2 | 12/2007 | Nordman et al. | |
| 7,331,858 | B2 | 2/2008 | McComb et al. | |
| 7,331,863 | B2 | 2/2008 | Baerlocher | |
| 7,488,253 | B2 | 2/2009 | Nordman et al. | |
| 8,092,296 | B2 | 1/2012 | Inoue | |
| 8,133,111 | B2 * | 3/2012 | Thomas | 463/20 |
| 8,287,371 | B2 * | 10/2012 | Visser | 463/32 |
| 2001/0016513 | A1 | 8/2001 | Muir et al. | |
| 2002/0025846 | A1 | 2/2002 | Bennett et al. | |
| 2002/0107064 | A1 | 8/2002 | Klitsner et al. | |
| 2003/0022712 | A1 * | 1/2003 | Locke | 463/20 |
| 2003/0064790 | A1 * | 4/2003 | Hughs-Baird et al. | 463/20 |
| 2004/0058725 | A1 | 3/2004 | Mayeroff | |
| 2004/0142738 | A1 | 7/2004 | Anderson et al. | |
| 2004/0214630 | A1 | 10/2004 | Mayeroff | |
| 2004/0219973 | A1 | 11/2004 | Cannon et al. | |
| 2004/0242302 | A1 | 12/2004 | Baerlocher | |
| 2005/0043081 | A1 | 2/2005 | Baerlocher | |
| 2005/0059454 | A1 | 3/2005 | McComb et al. | |
| 2005/0266913 | A1 | 12/2005 | Nordman | |
| 2005/0288093 | A1 | 12/2005 | Englman et al. | |
| 2006/0252487 | A1 | 11/2006 | Anderson et al. | |
| 2007/0054723 | A1 | 3/2007 | Mattice et al. | |
| 2007/0087811 | A1 | 4/2007 | Mayeroff | |
| 2009/0227371 | A1 | 9/2009 | Visser | |
| 2010/0151943 | A1 * | 6/2010 | Johnson et al. | 463/32 |

FOREIGN PATENT DOCUMENTS

| | | |
|---|---|---|
| EP | 1607917 | 12/2005 |
| GB | 881903 | 11/1961 |
| JP | 1201284 | 8/1989 |
| JP | 10216362 | 8/1998 |
| JP | 2001000729 | 1/2001 |
| JP | 2002078962 | 3/2002 |
| JP | 2002224383 | 8/2002 |
| JP | 2003169913 | 6/2003 |
| JP | 2005034314 | 2/2005 |
| KR | 20030039233 | 5/2003 |
| WO | WO2005020160 | 3/2005 |
| WO | WO2007046191 | 4/2007 |

OTHER PUBLICATIONS

United States Patent and Trademark Office, "Non-Final Office Action," issued in connection with U.S. Appl. No. 12/365,600, mailed on Aug. 18, 2011, 14 pages.

* cited by examiner

METHOD OF GAMING, A GAMING SYSTEM, AND A GAME CONTROLLER

CROSS-REFERENCE TO RELATED APPLICATIONS

The present application claims the benefit of priority to U.S. patent application Ser. No. 12/365,600, filed on Feb. 4, 2009, entitled "A METHOD OF GAMING A GAMING SYSTEM AND A GAME CONTROLLER," and Australian Provisional Patent Application No. 2008900492, filed on Feb. 4, 2008, entitled "A METHOD OF GAMING, A GAMING SYSTEM AND A GAME CONTROLLER", each of which is herein incorporated by reference in its entirety.

FIELD

The present invention relates to a method of gaming, a gaming system and a game controller.

BACKGROUND

It is known for gaming machines to include multipliers which alter the prize which is awarded to a player. For example, in a slot machine type game, a special symbol appearing on the stopped reels may award a player a two times multiplier for any prize won during that spin of the reels.

There is a need for an alternate technique for awarding a multiplier.

SUMMARY OF THE INVENTION

In a first aspect, the invention provides a method of gaming including:

generating a game outcome;

determining whether the game outcome includes a win outcome;

providing a three-dimensional representation of an object having a plurality of win outcome modifiers thereon;

controlling display of the object in response to a modification condition being met, such that the object is displayed as rotating and the axis around which it rotates changes at least once prior to the object stopping and such that after stopping, the selected modifier of the plurality of modifiers which is to be applied is apparent from the display; and modifying the win outcome with the selected modifier.

In an embodiment, the object is spherical.

In an embodiment, the win outcome modifiers correspond to respective ones of a plurality of regions of the surface of the object.

In an embodiment, at least some of the modifiers are win outcome multipliers.

In an embodiment, the axis of rotation changes a plurality of times.

In an embodiment, a direction of rotation of the object changes at least once.

In an embodiment, the method further includes displaying the object as translating relative to the display.

In an embodiment, the object translates by rolling.

In an embodiment, the object is displayed as translating relative to a plurality of targets each associated with a further win outcome modifier, the method including stopping the object at one of the plurality and additionally modifying the win outcome based on the further win outcome modifier.

In an embodiment, the path followed by the translating object is randomly determined In an embodiment, the method includes determining the stopping position of the object is randomly determined by employing a random number generator and a probability table.

In an embodiment, the sizes of the regions are related to the values of the modifiers.

In a second aspect, the invention provides a game controller for a gaming system, the game controller arranged to:

generate a game outcome;

determine whether the game outcome includes a win outcome;

control display on a display of a three-dimensional representation of an object having a plurality of win outcome modifiers thereon in response to a modification condition being met, such that the object is displayed as rotating and the axis around which it rotates changes at least once prior to the object stopping and such that after stopping, the selected modifier of the plurality of modifiers which is to be applied is apparent from the display; and modify the win outcome with the selected modifier.

In an embodiment, the game controller includes a modifier controller arranged to select the modifier which is to be applied.

In an embodiment, the game controller includes a processor and a memory storing program code which when executed implements the functions of generating an outcome, determining whether the outcome includes a winning outcome, controlling display of the object and modifying the win outcome.

In a third aspect, the invention provides a gaming system including:

a display; and a game controller arranged to:

generate a game outcome;

determine whether the game outcome includes a win outcome;

control display on the display of a three-dimensional representation of an object having a plurality of win outcome modifiers thereon in response to a modification condition being met, such that the object is displayed as rotating and the axis around which it rotates changes at least once prior to the object stopping and such that after stopping, the selected modifier of the plurality of modifiers which is to be applied is apparent from the display; and modify the win outcome with the selected modifier.

In a fourth aspect, the invention provides a method of gaming including:

generating a game outcome;

determining whether the game outcome includes a win outcome;

providing a three-dimensional representation of an object having a plurality of win outcome modifiers thereon and representation of a plurality of targets, each target associated visually with a modifier;

controlling display of the object in response to a modification condition being met, such that the object is displayed as moving relative to the targets and stopping at one of the targets, such that after stopping, a composite modifier, formed by the combination of the modifier of the object at the stop position and the modifier of the target at which the object stopped, is apparent from the display; and modifying the win outcome with the composite modifier.

In a fifth aspect, the invention provides a game controller for a gaming system, the game controller arranged to:

generate a game outcome;

determine whether the game outcome includes a win outcome;

control display on a display of a three-dimensional representation of an object having a plurality of win outcome modifiers thereon in response to a modification condition being met, such that the object is displayed as moving relative to the targets and stopping at one of the targets, such that after stopping, a composite modifier, formed by the combination of the modifier of the object at the stop position and the modifier of the target at which the object stopped, is apparent from the display; and modify the win outcome with the composite modifier.

In a sixth aspect, the invention provides a gaming system including:

a display; and a game controller arranged to:

generate a game outcome;

determine whether the game outcome includes a win outcome;

control display on the display of a three-dimensional representation of an object having a plurality of win outcome modifiers thereon in response to a modification condition being met, such that the object is displayed as moving relative to the targets and stopping at one of the targets, such that after stopping, a composite modifier, formed by the combination of the modifier of the object at the stop position and the modifier of the target at which the object stopped, is apparent from the display; and modify the win outcome with the composite modifier.

In a seventh aspect, the invention provides a Computer program code which when executed implements the above methods.

In an eighth aspect, the invention provides a computer readable medium including the above program code.

In a ninth aspect, the invention provides a data signal including the above program code.

Figure 1:
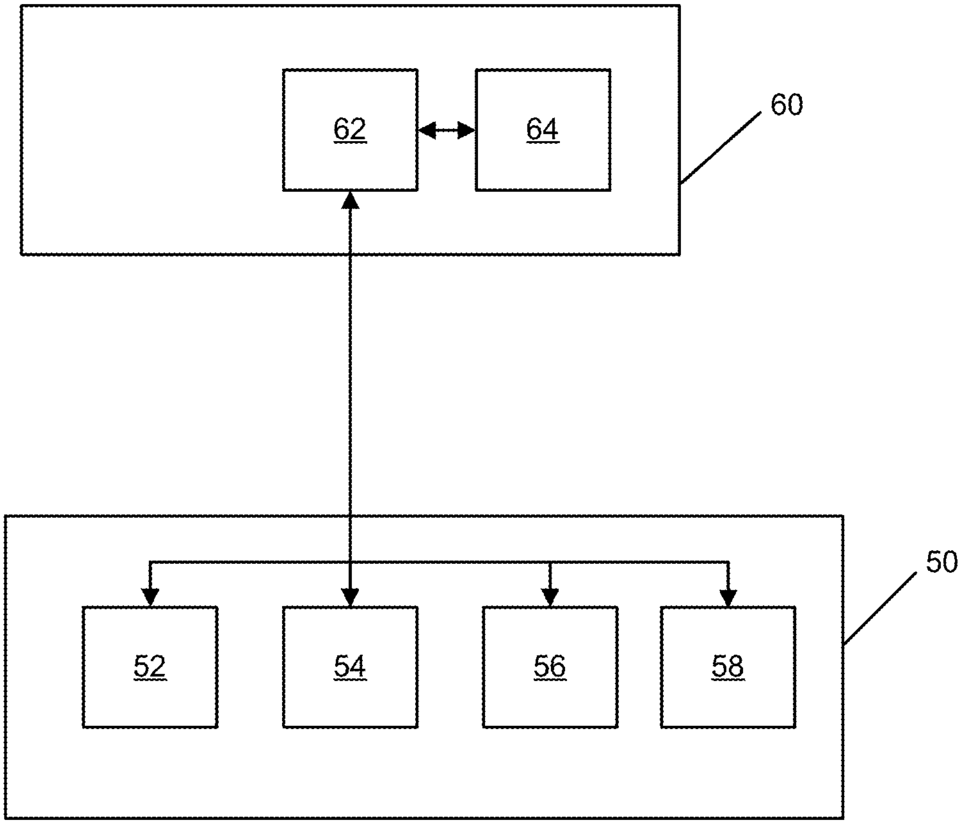
FIG. 1 is a block diagram of the core components of a gaming system.

The foregoing summary, as well as the following detailed description of certain embodiments of the present invention, will be better understood when read in conjunction with the appended drawings. For the purpose of illustrating the invention, certain embodiments are shown in the drawings. It should be understood, however, that the present invention is not limited to the arrangements and instrumentality shown in the attached drawings.

DETAILED DESCRIPTION

Referring to the drawings, there is shown a gaming system having a game controller arranged to implement a game where an rotating object with a changing axis of rotation is used to display a win outcome modifier when. In an embodiment, the object is a multiplier ball having a plurality of different multipliers thereon. The modifier that applies is that modifier that is displayed when the ball stops. In an embodiment, the multipliers at intervals around the surface in regions whose sizes are based at least partly on the value of the modifier. The gaming system can take a number of different forms.

In a first form, a stand alone gaming machine is provided wherein all or most components implementing the game are present in a player operable gaming machine.

In a second form, a distributed architecture is provided wherein some of the components implementing the game are present in a player operable gaming machine and some of the components implementing the game are located remotely relative to the gaming machine. For example, a "thick client" architecture may be used wherein part of the game is executed on a player operable gaming machine and part of the game is executed remotely, such as by a gaming server; or a "thin client" architecture may be used wherein most of the game is executed remotely such as by a gaming server and a player operable gaming machine is used only to display audible and/or visible gaming information to the player and receive gaming inputs from the player.

However, it will be understood that other arrangements are envisaged. For example, an architecture may be provided wherein a gaming machine is networked to a gaming server and the respective functions of the gaming machine and the gaming server are selectively modifiable. For example, the gaming system may operate in stand alone gaming machine mode, "thick client" mode or "thin client" mode depending on the game being played, operating conditions, and so on. Other variations will be apparent to persons skilled in the art.

Irrespective of the form, the gaming system includes several core components. At the broadest level, the core components are a player interface 50 and a game controller 60 as illustrated in FIG. 1. The player interface is arranged to enable manual interaction between a player and the gaming system and for this purpose includes the input/output components for the player to enter instructions and play the game.

Components of the player interface may vary from embodiment to embodiment but will typically include a credit mechanism 52 to enable a player to input credits and receive payouts, one or more displays 54, a game play mechanism 56 that enables a player to input game play instructions (e.g. to place bets), and one or more speakers 58.

The game controller 60 is in data communication with the player interface and typically includes a processor 62 that processes the game play instructions in accordance with game play rules and outputs game play outcomes to the display. Typically, the game play instructions are stored as program code in a memory 64 but can also be hardwired. Herein the term "processor" is used to refer generically to any device that can process game play instructions in accordance with game play rules and may include: a microprocessor, microcontroller, programmable logic device or other computational device, a general purpose computer (e.g. a PC) or a server.

Figure 2:
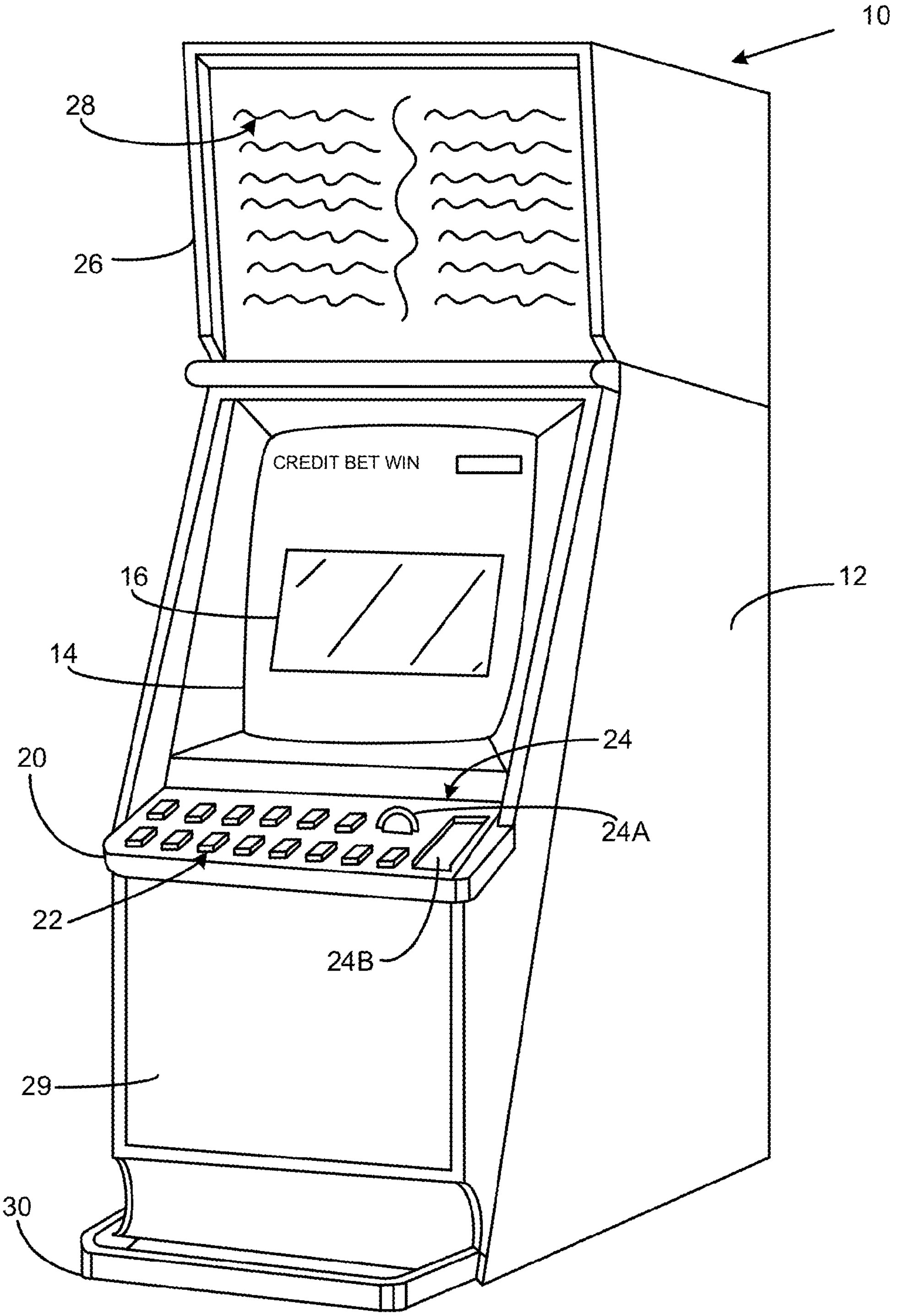
FIG. 2 is a perspective view of a stand alone gaming machine.

A gaming system in the form of a stand alone gaming machine 10 is illustrated in FIG. 2. The gaming machine 10 includes a console 12 having a display 14 on which are displayed representations of a game 16 that can be played by a player. A mid-trim 20 of the gaming machine 10 houses a bank of buttons 22 for enabling a player to interact with the gaming machine, in particular during game play. The mid-trim 20 also houses a credit input mechanism 24 which in this example includes a coin input chute 24A and a bill collector 24B. Other credit input mechanisms may also be employed, for example, a card reader for reading a smart card, debit card or credit card. A player marketing module (not shown) having a reading device may also be provided for the purpose of reading a player tracking device, for example as part of a loyalty program. The player tracking device may be in the form of a card, flash drive or any other portable storage medium capable of being read by the reading device.

A top box 26 may carry artwork 28, including for example pay tables and details of bonus awards and other information or images relating to the game. Further artwork and/or information may be provided on a front panel 29 of the console 12. A coin tray 30 is mounted beneath the front panel 29 for dispensing cash payouts from the gaming machine 10.

The display 14 shown in FIG. 2 is in the form of a video display unit, particularly a cathode ray tube screen device. Alternatively, the display 14 may be a liquid crystal display, plasma screen, any other suitable video display unit, or the visible portion of an electromechanical device. The top box 26 may also include a display, for example a video display unit, which may be of the same type as the display 14, or of a different type. It will be appreciated that the multiplier ball of the embodiment needs to be displayed on a video display, however, this could be on the main display 14 or a top box display. Hence, the multiplier ball could be used in combination with a main display 14 formed by an electromechanical device, such as a set of stepper reels of a stepper gaming machine.

Figure 3:
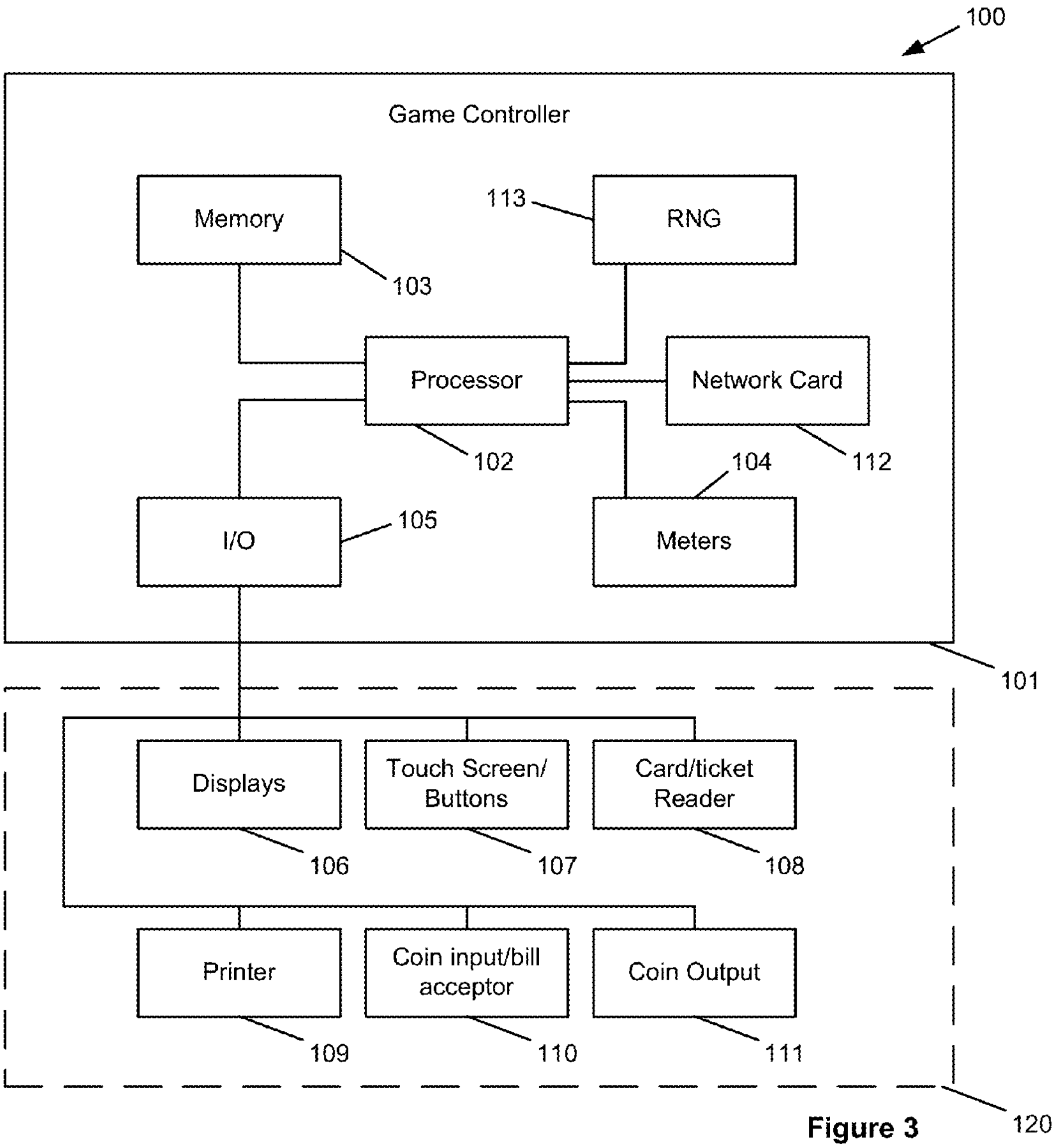
FIG. 3 is a block diagram of the functional components of a gaming machine.

FIG. 3 shows a block diagram of operative components of a typical gaming machine which may be the same as or different to the gaming machine of FIG. 2.

The gaming machine 100 includes a game controller 101 having a processor 102. Instructions and data to control operation of the processor 102 are stored in a memory 103, which is in data communication with the processor 102. Typically, the gaming machine 100 will include both volatile and non-volatile memory and more than one of each type of memory, with such memories being collectively represented by the memory 103.

The gaming machine has hardware meters 104 for purposes including ensuring regulatory compliance and monitoring player credit, an input/output (I/O) interface 105 for communicating with peripheral devices of the gaming machine 100. The input/output interface 105 and/or the peripheral devices may be intelligent devices with their own memory for storing associated instructions and data for use with the input/output interface or the peripheral devices. A random number generator module 113 generates random numbers for use by the processor 102. Persons skilled in the art will appreciate that the reference to random numbers includes pseudo-random numbers.

In the example shown in FIG. 3, a player interface 120 includes peripheral devices that communicate with the game controller 101 include one or more displays 106, a touch screen and/or buttons 107, a card and/or ticket reader 108, a printer 109, a bill acceptor and/or coin input mechanism 110 and a coin output mechanism 111. Additional hardware may be included as part of the gaming machine 100, or hardware may be omitted based on the specific implementation.

In addition, the gaming machine 100 may include a communications interface, for example a network card 112. The network card may, for example, send status information, accounting information or other information to a central controller, server or database and receive data or commands from the central controller, server or database.

Figure 4:
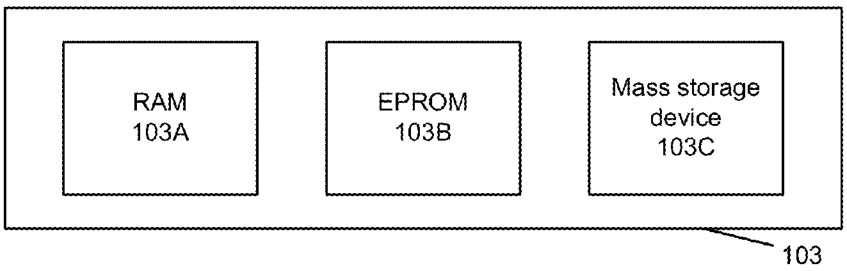
FIG. 4 is a schematic diagram of the functional components of a memory.

FIG. 4 shows a block diagram of the main components of an exemplary memory 103. The memory 103 includes RAM 103A, EPROM 103B and a mass storage device 103C. The RAM 103A typically temporarily holds program files for execution by the processor 102 and related data. The EPROM 103B may be a boot ROM device and/or may contain some system or game related code. The mass storage device 103C is typically used to store game programs, the integrity of which may be verified and/or authenticated by the processor 102 using protected code from the EPROM 103B or elsewhere.

It is also possible for the operative components of the gaming machine 100 to be distributed, for example input/output devices 106, 107, 108, 109, 110, 111 to be provided remotely from the game controller 101.

Figure 5:
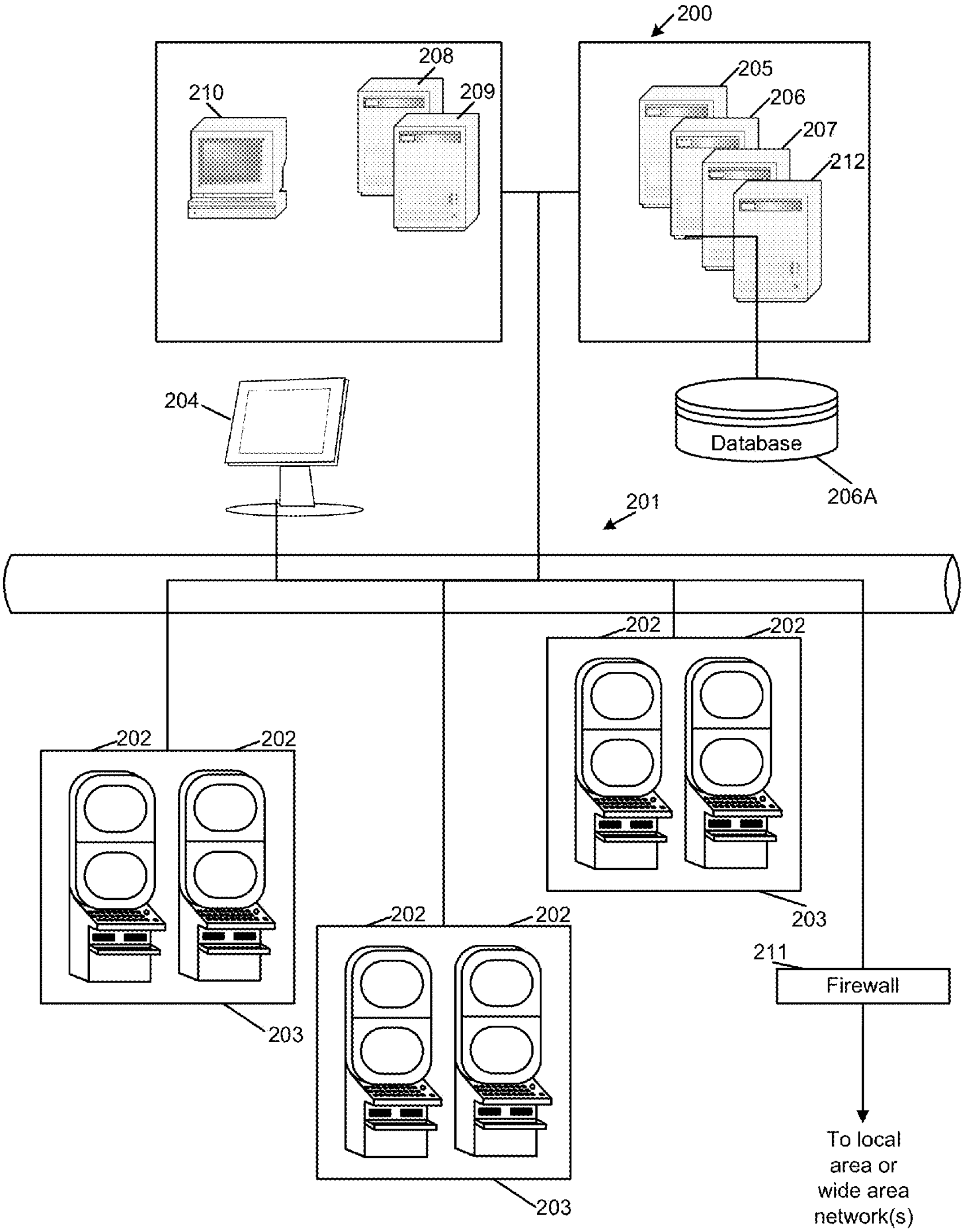
FIG. 5 is a schematic diagram of a network gaming system.

FIG. 5 shows a gaming system 200 in accordance with an alternative embodiment. The gaming system 200 includes a network 201, which for example may be an Ethernet network. Gaming machines 202, shown arranged in three banks 203 of two gaming machines 202 in FIG. 5, are connected to the network 201. The gaming machines 202 provide a player operable interface and may be the same as the gaming machines 10,100 shown in FIGS. 2 and 3, or may have simplified functionality depending on the rules and/or guidelines for implementing game play. While banks 203 of two gaming machines are illustrated in FIG. 5, banks of one, three or more gaming machines are also envisaged.

One or more displays 204 may also be connected to the network 201. For example, the displays 204 may be associated with one or more banks 203 of gaming machines. The displays 204 may be used to display representations associated with game play on the gaming machines 202, and/or used to display other representations, for example promotional or informational material.

In a thick client embodiment, game server 205 implements part of the game played by a player using a gaming machine 202 and the gaming machine 202 implements part of the game. With this embodiment, as both the game server and the gaming device implement part of the game, they collectively provide a game controller. A database management server 206 may manage storage of game programs and associated data for downloading or access by the gaming devices 202 in a database 206A. Typically, if the gaming system enables players to participate in a Jackpot game, a Jackpot server 207 will be provided to perform accounting functions for the Jackpot game. A loyalty program server 212 may also be provided.

In a thin client embodiment, game server 205 implements most or all of the game played by a player using a gaming machine 202 and the gaming machine 202 essentially provides only the player interface. With this embodiment, the game server 205 provides the game controller. The gaming machine will receive player instructions, pass these to the game server which will process them and return game play outcomes to the gaming machine for display. In a thin client embodiment, the gaming machines could be computer terminals, e.g. PCs running software that provides a player interface operable using standard computer input and output components.

Servers are also typically provided to assist in the administration of the gaming network 200, including for example a gaming floor management server 208, and a licensing server 209 to monitor the use of licenses relating to particular games. An administrator terminal 210 is provided to allow an administrator to run the network 201 and the devices connected to the network.

The gaming system 200 may communicate with other gaming systems, other local networks, for example a corporate network, and/or a wide area network such as the Internet, for example through a firewall 211.

Persons skilled in the art will appreciate that in accordance with known techniques, functionality at the server side of the network may be distributed over a plurality of different computers. For example, elements may be run as a single "engine" on one server or a separate server may be provided. For example, the game server 205 could run a random generator engine. Alternatively, a separate random number generator server could be provided. Further, persons skilled in the art will appreciate that a plurality of game servers could be provided to run different games or a single game server may run a plurality of different games based on the terminals.

Persons skilled in the art will also appreciate that the method of the preferred embodiment could be embodied in program code. The program code could be supplied in a number of ways, for example on a computer readable medium, such as a disc or a memory (for example, that could replace part of memory 103) or as a data signal (for example, by downloading it from a server).

Figure 6:
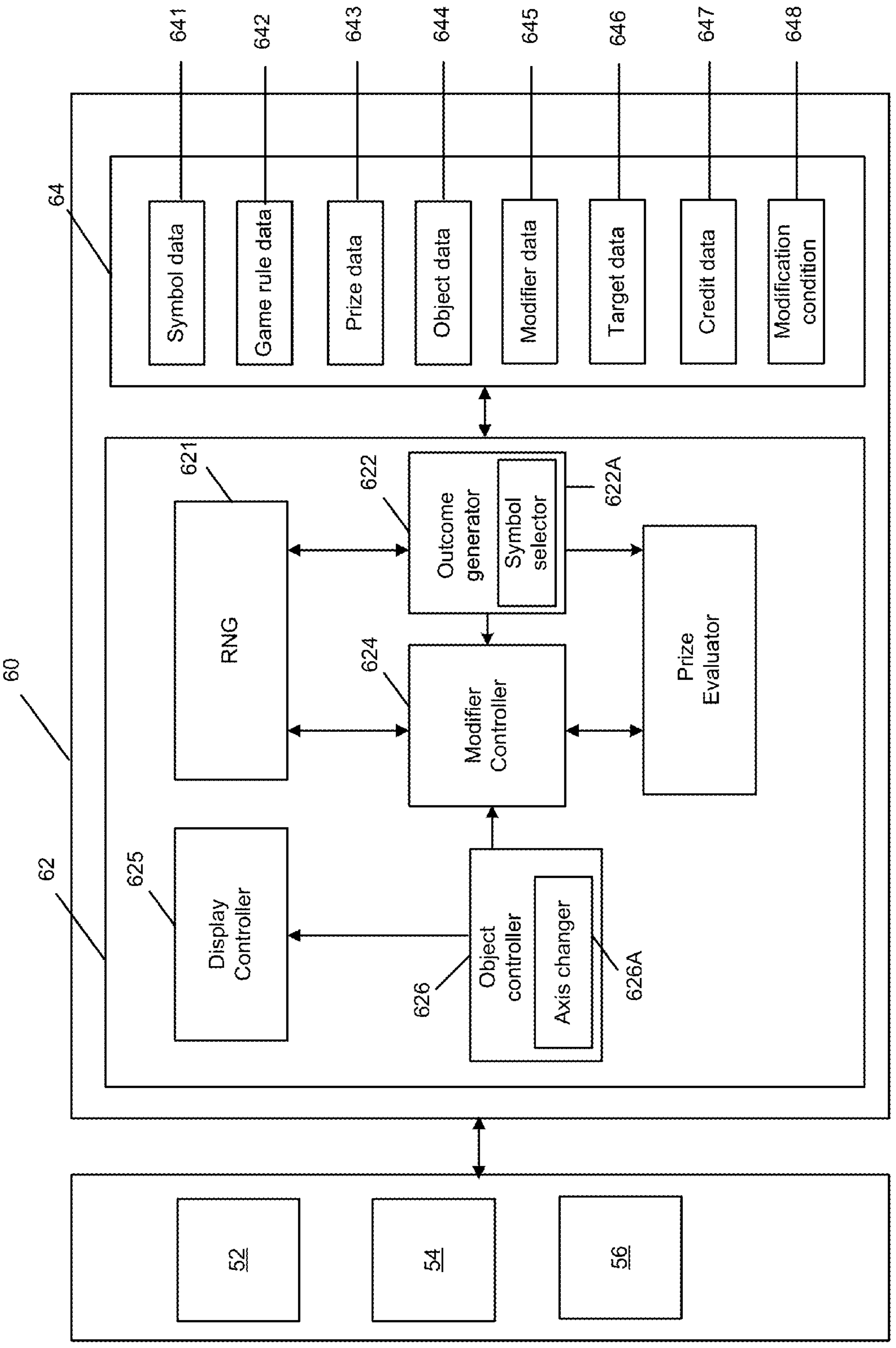
FIG. 6 is a further block diagram of a gaming system.

A more detailed schematic view of a gaming system is shown in FIG. 6 which shows that a number of modules are implemented by processor 62 based on program code stored in memory 64. Persons skilled in the art will appreciate that other hardware/software implementations are possible.

In FIG. 6, a player plays the game by entering currency with the credit mechanism which is converted to credits by game controller 60 and stored as credit data 647. The credit data will be modified in accordance with game play and in particular by wager instructions input with the game play mechanism 56 and the prizes evaluated by the prize evaluator 623.

The game illustrated in FIG. 6 is off the type where an outcome generator generated game outcomes by selecting symbols with a symbol selector 621 from symbol data 641 in accordance with a probability table based on a random number obtained from a random number generator 621. In an embodiment, the game may be a spinning reel game where the symbols are the symbols on a plurality of reels. The prize outcomes are determined by the prize evaluator based on the player's win entitlement (which is based on the wager the player made) and the prize data 643. That is, certain game outcomes will be win outcomes for the player.

Persons skilled in the art will appreciate that a player's win entitlement will vary from game to game and may or may not be dependent on player selections. In most spinning reel games, it is typical for the player's entitlement to be affected by the amount they wager and selections they wake (i.e. the nature of the wager). For example, a player's win entitlement may be based on how many lines they will play in each game—i.e. a minimum of one line up to the maximum number of lines allowed by the game (noting that not all permutations of win lines may be available for selection. In many games, the player's win entitlement is not strictly limited to the lines they have selected, for example, "scatter" pays are awarded independently of a player's selection of pay lines and are an inherent part of the win entitlement.

Persons, skilled in the art, will appreciate that in other embodiments, the player may obtain a win entitlement by selecting a number of reels to play. Such games are marketed under the trade name "Reel Power" by Aristocrat Leisure Industries Pty Ltd. The selection of the reel means that each symbol of the reel can be substituted for a symbol at one or more designated display positions.

In other embodiments a player win entitlement may be defined by purchasing access to particular pay tables—e.g. a first bet amount entitles the player to wins including cherries and a second amount entitles them to wins including plums. The win entitlement is not always purchased—e.g. a series of free games may be awarded.

A win outcome is determined based on the selected symbols of a game outcome and a player's win entitlement and a pay table 643 that specifies awards.

In embodiments of this invention, a win outcome is modified by a win outcome modifier if a modification condition 648 is determined to be met by the modifier controller 624 , for example if the outcome generator 622 generates an outcome that includes a designated symbol or symbol combination. In an embodiment, a modifier may be determined each time a win outcome occurs. Modifiers may be, for example, absolute values or multipliers. The modifiers may include modifiers that do not change the win outcome (particularly in embodiments where a modifier is always calculated). A modifier may be determined in a one stage or two stage process as described in further detail below. Once the modifier is determined and displayed to the player, the prize evaluator 623 modifies the prize outcome and updates credit data 647. The player may redeem credits via the credit mechanism 52.

In most embodiments of this invention, the modifiers are displayed by an object such a spherical ball which is displayed as rotating and having a changing axis of rotation—i.e. which changes at least once and typically multiple times-until the object stops, whereafter the object controller controls the display such that the modifier selected by the modifier controller is apparent—for example buy highlighting the modifier that is to be applied.

In some embodiments, the object also moves by translation. This provides a novel and effective way of displaying the modifier. Display of the object by display controller 625 is controlled by object controller which controls the movement of the object based on object data 644 and includes and axis changer 626A—i.e. part of the control is to change the axis of rotation.

In an embodiment, a composite modifier may be applied. In such an embodiment, a plurality of targets specified by target data 646 are displayed on display 54 and the object is displayed as moving by translation relative to the targets. Each target has an associated further modifier and a target is randomly selected by the modifier controller such that the modifier on the object and the modifier on the target are combined to form a composite modifier which is applied by the prize evaluator 623. The further modifier may have the effect of adding to the object modifier, negating the object modifier (e.g. a zero multiplier) or making no difference (e.g. a one times multiplier). It will be appreciated that in this embodiment, while the effect of the object, such as a ball, rotating around a changing axis is particularly advantageous, the object need not spin relative to the target while providing the advantageous effect of the modifier being indicated partly by the object and partly by the target.

Persons skilled in the art will appreciate that while it is described above that the modifiers of the target and object are determined independently, they could be determine as a single modifier which is then split between the object and the target.

EXAMPLES

Example 1

Figure 7A:
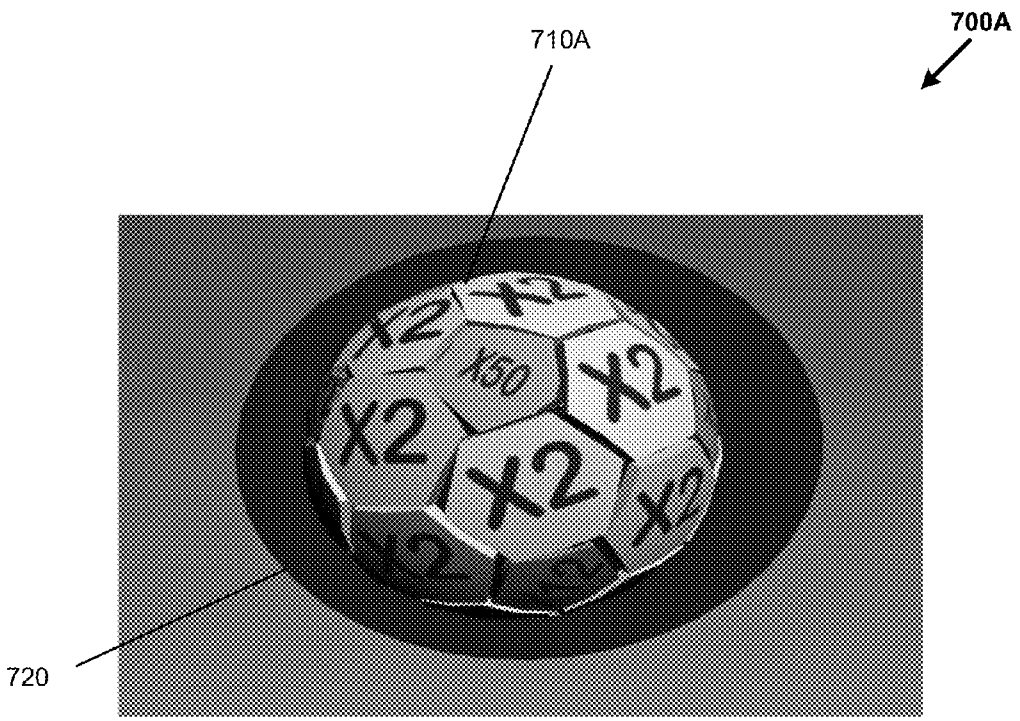
FIG. 7A-7D are exemplary displays of a first example.

In a first example, shown the exemplary displays of FIG. 7A to 7D. The ball is initially displayed at rest in a first position 710A within an aperture 720. From this first display 700A, it will be seen that there are a plurality of different regions on the ball which correspond to different modifiers, which in these examples are multipliers. The multipliers visible in FIG. 7A are a ×2 and a ×50 multiplier. The shapes of the regions are not of particular importance, however, it is assistance if they can be distinguished by either borders or different colours designating different multipliers.

Figure 7B:
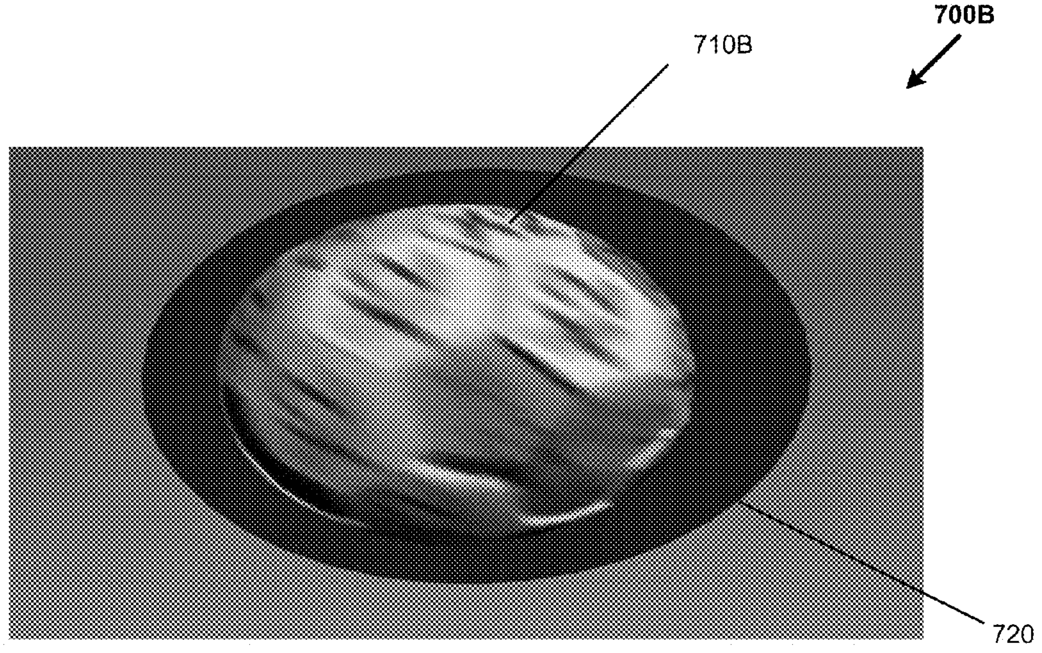

In FIG. 7B there is shown a further display 700B where the ball is shown as spinning within the aperture 720 such that the multipliers cannot readily be perceived. The spinning is such that the axis of rotation changes at least once.

Figure 7C:
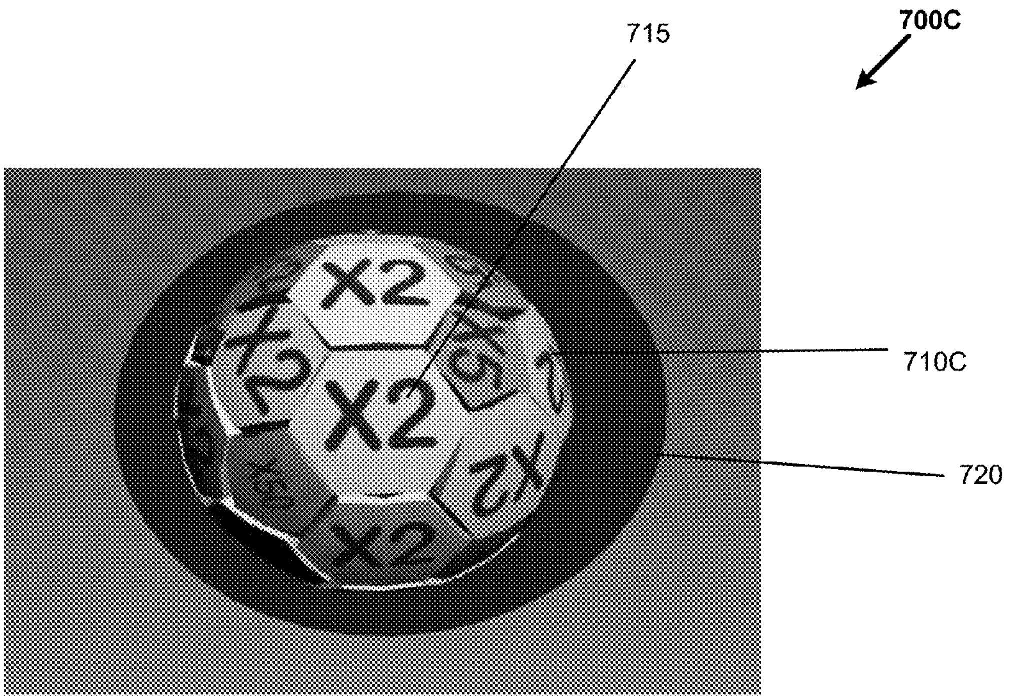

FIG. 7C shows a further view where the ball has stopped at a stop position 710C with a 2× multiplier 715 at the centre of the ball to indicate that this is the multiplier that will apply.

Figure 7D:
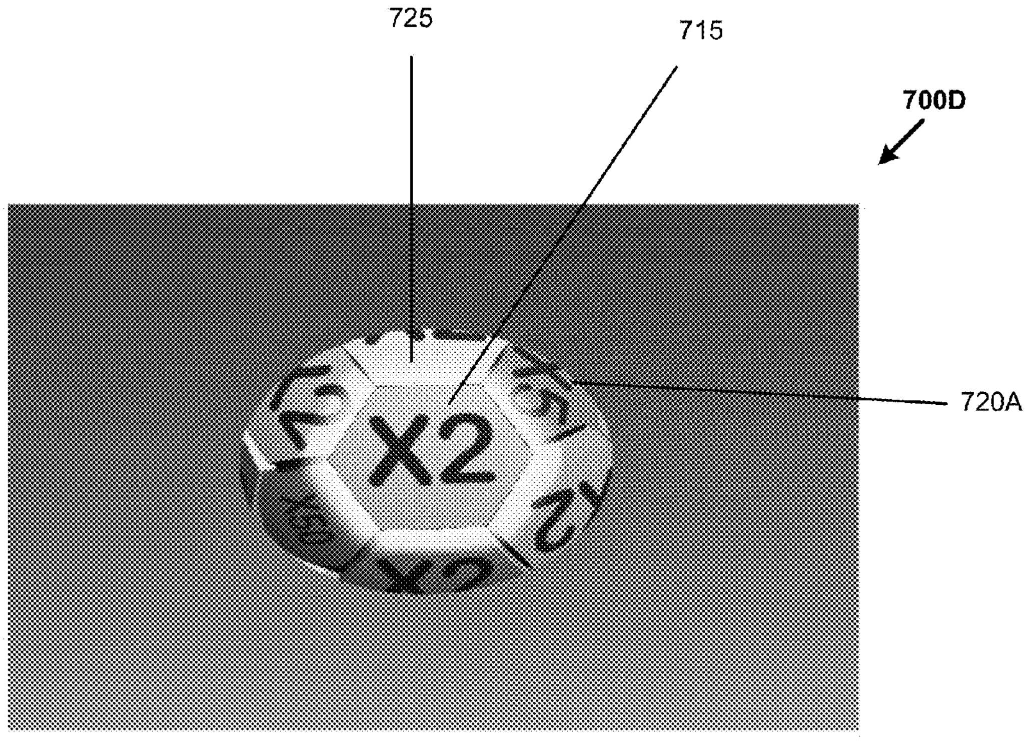

In FIG. 7D, it is shown that the object controller controls the display of the object to further highlight that the ×2 multiplier 715 applies by narrowing the aperture 720A and highlighting 725 the ×2 multiplier.

Example 2

In the second example, the multiplier ball 830 is displayed as moving by spinning and translating behind a screen 805 which has a number of slots therein 810 to 815 which provide a six different target 810 to 815 associated with six different modifiers 820 to 825. From the modifiers shown in the exemplary display 800A, it is seen that the modifier can be a multiplier as indicated by items 820 to 822 or an alternative prize as indicated by items 823 to 825 which correspond to different jackpot levels. That is, in this example, the prize can be modified by being replaced with a jackpot prize or supplemented by a jackpot prize.

Figure 8A:
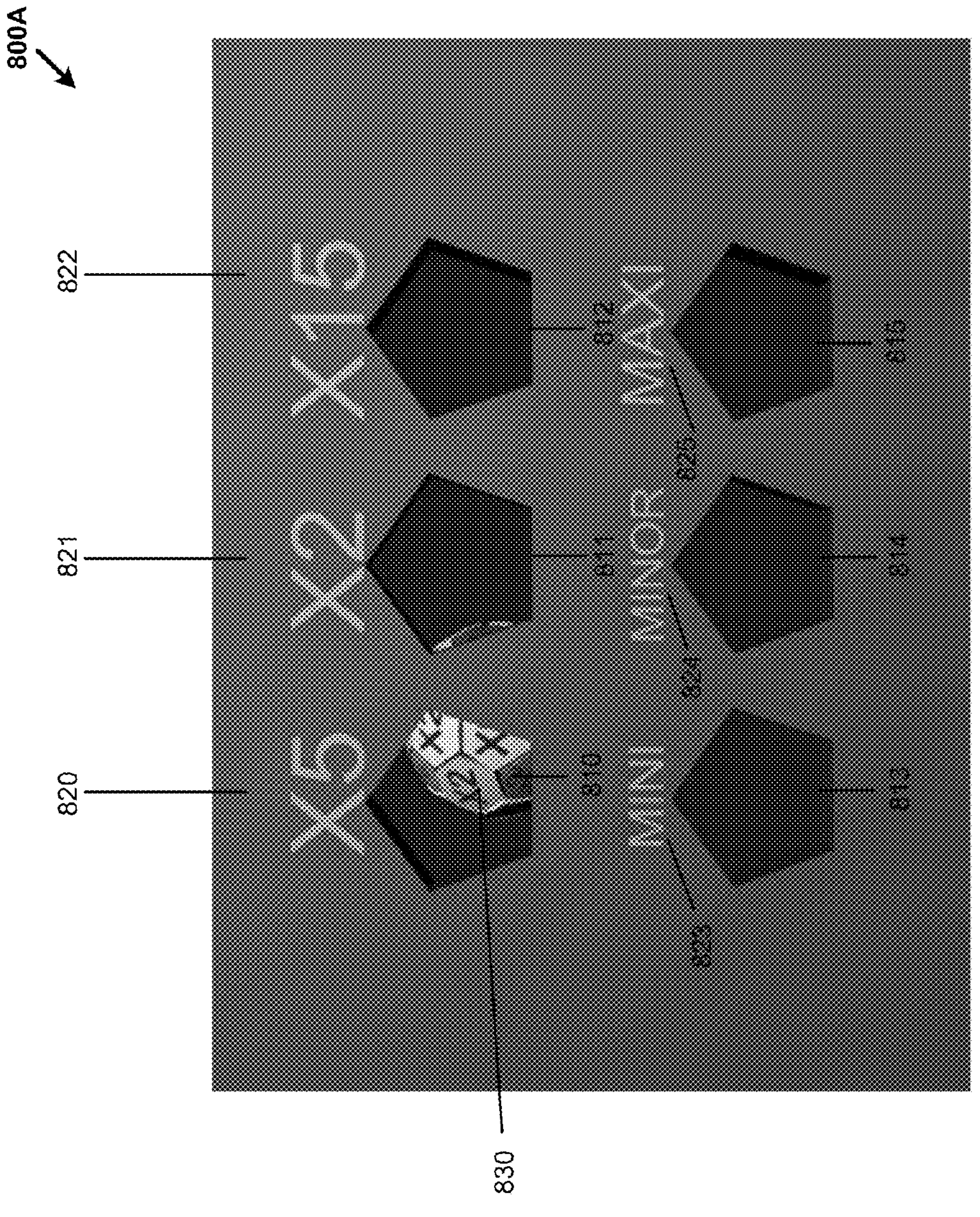
FIG. 8A-8B are exemplary displays of a second example.
Figure 8B:
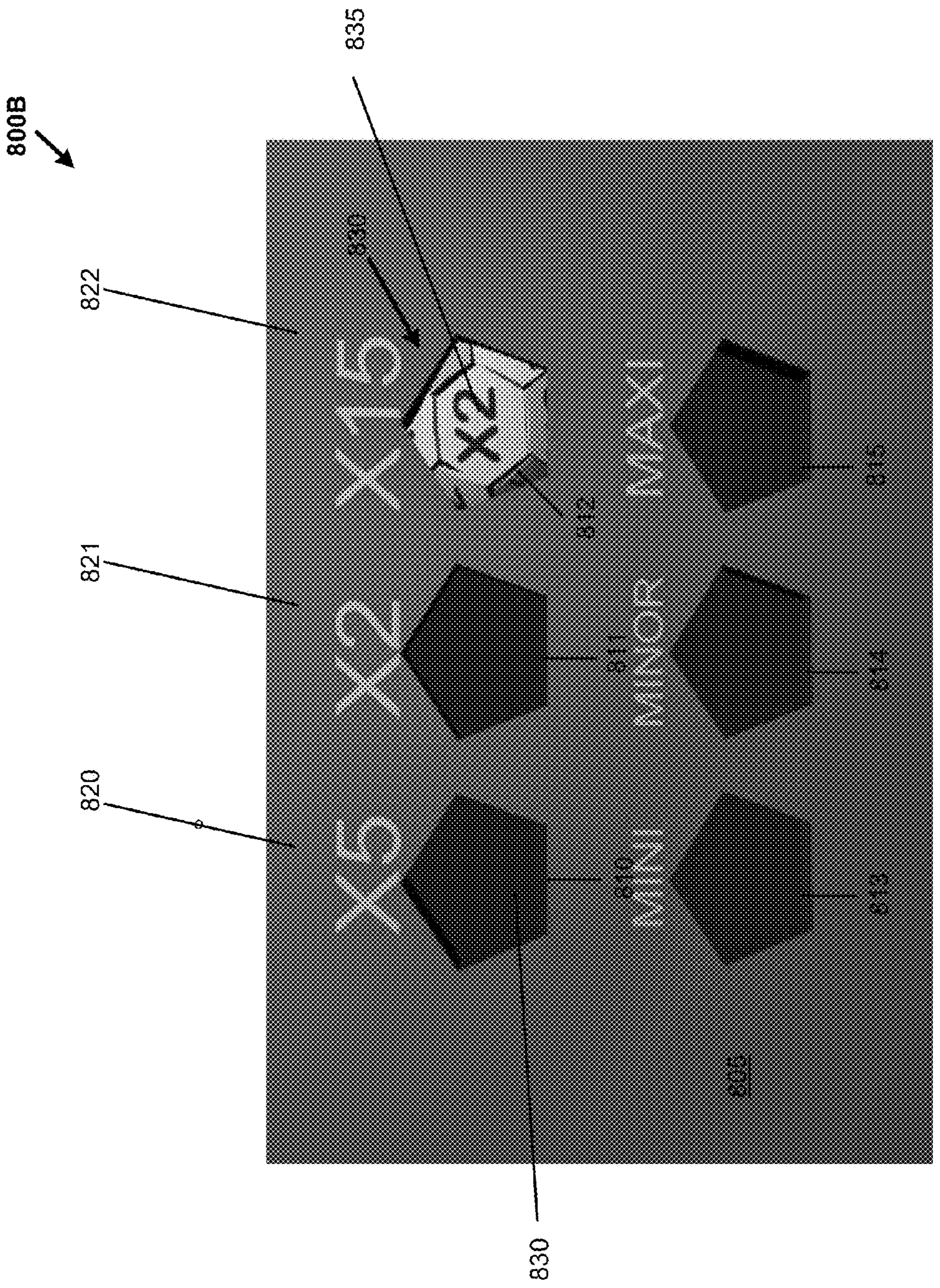

Referring now to FIG. 8B, it will be seen that the ball 830 has come to a stop position where the 2× multiplier 835 is displayed within slot 812 indicating that a total multiplier of ×30 (i.e. 2×15) will apply to the prize and needs to be implemented by the prize evaluator 623.

It will be apparent that the roaming object in this example could also be a dice, a coin (with either win or no win) or any other object. A "no win" target could also be added—i.e. effectively a negating modifier.

It will also be apparent that this target embodiment can be employed with an object that does not spin—i.e. in a variant where the novel display effect is provided by combining a target having a first modifier and a moving object having a second modifier from which a composite modifier is apparent on the display.

Figure 9:
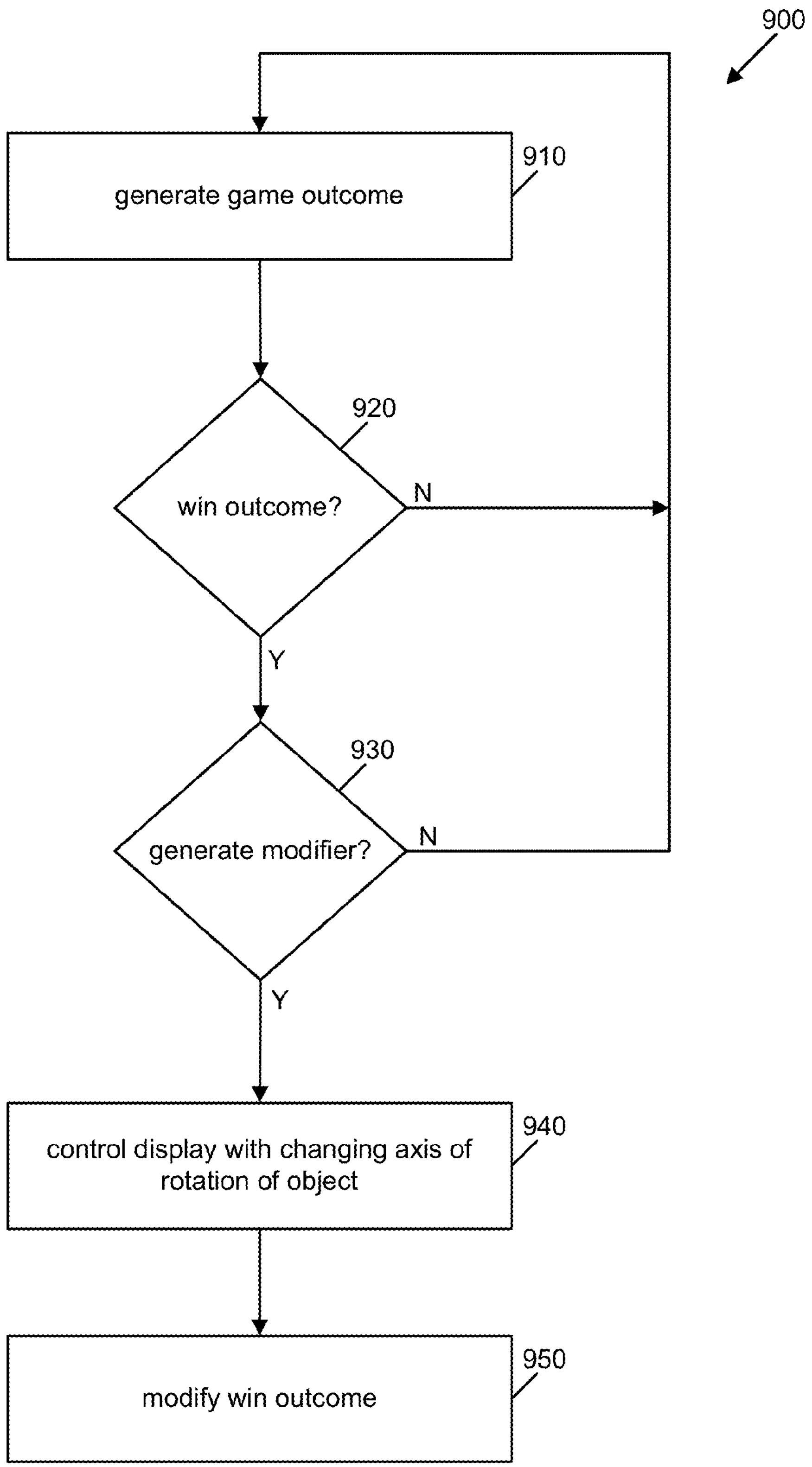
FIG. 9 shows a flow diagram for an example method for game outcome generation.

FIG. 9 shows a flow diagram for an example method 900 for game outcome generation. At 910, a game outcome is generated. For example, a game outcome is generated by selecting symbols (e.g., with the symbol selector 621) from symbol data (e.g., symbol data 641) in accordance with a probability table based on a random number (e.g., a random number obtained from a random number generator 621). In an embodiment, the game may be a spinning reel game where the symbols are the symbols on a plurality of reels.

At 920, a win outcome is determined. For example, win or prize outcome(s) can be determined by a prize evaluator based on the player's win entitlement (which is based on the wager the player made) and prize data. That is, certain game outcomes will be win outcomes for the player.

Persons skilled in the art will appreciate that a player's win entitlement will vary from game to game and may or may not be dependent on player selections. In most spinning reel games, it is typical for the player's entitlement to be affected by the amount they wager and selections they wake (i.e. the nature of the wager). For example, a player's win entitlement may be based on how many lines they will play in each game—i.e. a minimum of one line up to the maximum number of lines allowed by the game (noting that not all permutations of win lines may be available for selection. In many games, the player's win entitlement is not strictly limited to the lines they have selected, for example, "scatter" pays are awarded independently of a player's selection of pay lines and are an inherent part of the win entitlement.

Persons, skilled in the art, will appreciate that in other embodiments, the player may obtain a win entitlement by selecting a number of reels to play. Such games are marketed under the trade name "Reel Power" by Aristocrat Leisure Industries Pty Ltd. The selection of the reel means that each symbol of the reel can be substituted for a symbol at one or more designated display positions.

In other embodiments a player win entitlement may be defined by purchasing access to particular pay tables—e.g. a first bet amount entitles the player to wins including cherries and a second amount entitles them to wins including plums. The win entitlement is not always purchased—e.g. a series of free games may be awarded.

A win outcome can be determined based on the selected symbols of a game outcome and a player's win entitlement and a pay table 643 that specifies awards, for example.

At 930, a modifier may be generated. For example, in certain embodiments, a win outcome is modified by a win outcome modifier if a modification condition (e.g., modification condition 648) is met (e.g., based on a determination by the modifier controller 624). For example, if the outcome generator 622 generates an outcome that includes a designated symbol or symbol combination, a win outcome modifier is generated. In an embodiment, a modifier may be determined each time a win outcome occurs. Modifiers may be, for example, absolute values or multipliers. The modifiers may include modifiers that do not change the win outcome (particularly in embodiments where a modifier is always calculated).

At 940, a game display is controlled by changing an axis of rotation of an object being displayed. For example, one or more modifiers are displayed by an object such a spherical ball which is displayed as rotating and having a changing axis of rotation—i.e. which changes at least once and typically multiple times—until the object stops, whereafter the object controller controls the display such that the modifier selected by the modifier controller is apparent—for example by highlighting the modifier that is to be applied.

At 950, a win outcome is modified based on the modifier. For example, once the modifier is determined and displayed to the player, the prize outcome and credit data are modified (e.g., the prize evaluator 623 modifies the prize outcome and updates credit data 647).

Figure 10:
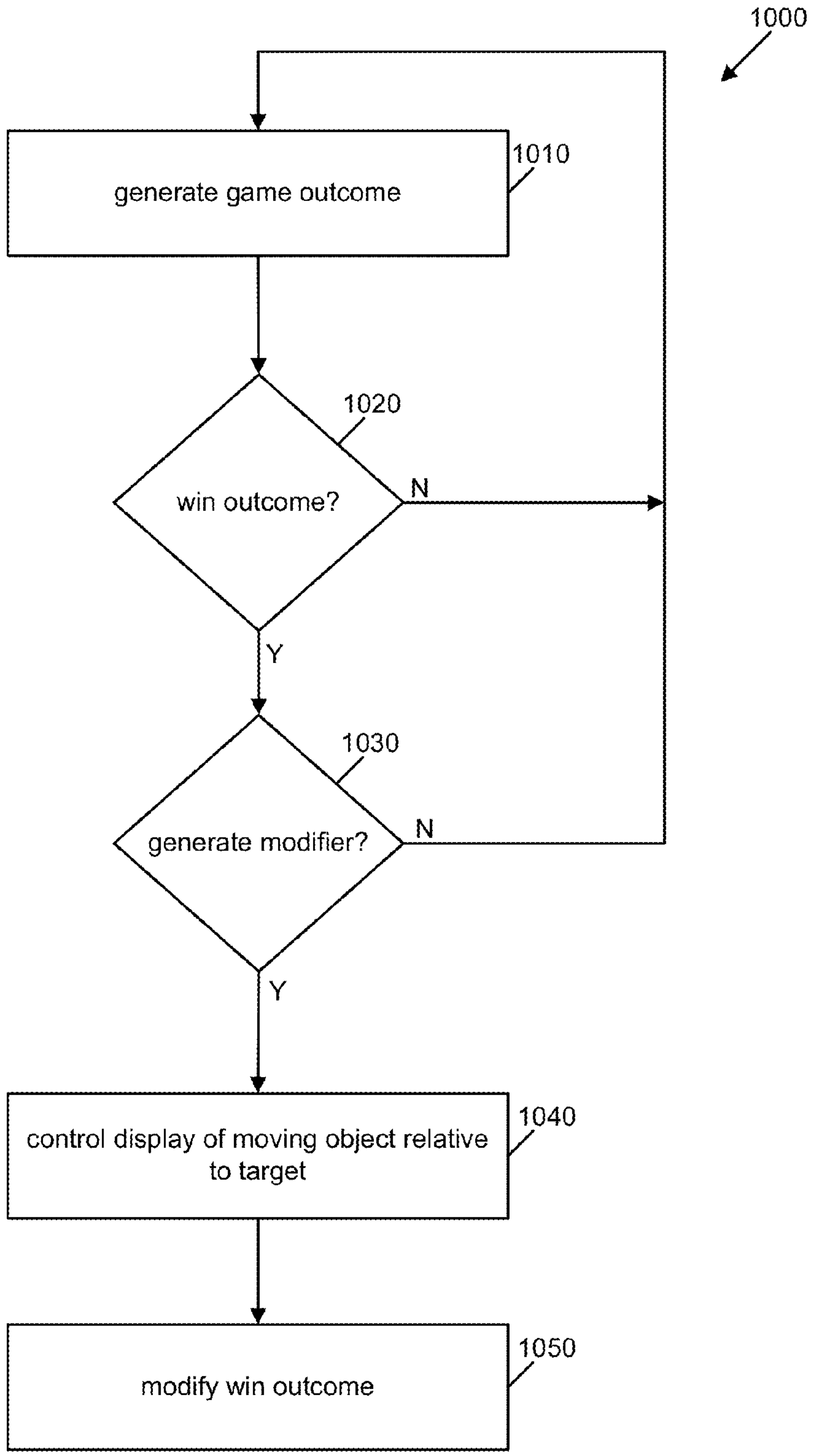
FIG. 10 shows a flow diagram for an example method for game outcome generation.

FIG. 10 shows a flow diagram for an example method 1000 for game outcome generation. At 1010, a game outcome is generated. For example, a game outcome is generated by selecting symbols (e.g., with the symbol selector 621) from symbol data (e.g., symbol data 641) in accordance with a probability table based on a random number (e.g., a random number obtained from a random number generator 621). In an embodiment, the game may be a spinning reel game where the symbols are the symbols on a plurality of reels.

At 1020, a win outcome is determined. For example, win or prize outcome(s) can be determined by a prize evaluator based on the player's win entitlement (which is based on the wager the player made) and prize data. That is, certain game outcomes will be win outcomes for the player.

Persons skilled in the art will appreciate that a player's win entitlement will vary from game to game and may or may not be dependent on player selections. In most spinning reel games, it is typical for the player's entitlement to be affected by the amount they wager and selections they wake (i.e. the nature of the wager). For example, a player's win entitlement may be based on how many lines they will play in each game—i.e. a minimum of one line up to the maximum number of lines allowed by the game (noting that not all permutations of win lines may be available for selection. In many games, the player's win entitlement is not strictly limited to the lines they have selected, for example, "scatter" pays are awarded independently of a player's selection of pay lines and are an inherent part of the win entitlement.

Persons, skilled in the art, will appreciate that in other embodiments, the player may obtain a win entitlement by selecting a number of reels to play. Such games are marketed under the trade name "Reel Power" by Aristocrat Leisure Industries Pty Ltd. The selection of the reel means that each symbol of the reel can be substituted for a symbol at one or more designated display positions.

In other embodiments a player win entitlement may be defined by purchasing access to particular pay tables—e.g. a first bet amount entitles the player to wins including cherries and a second amount entitles them to wins including plums. The win entitlement is not always purchased—e.g. a series of free games may be awarded.

A win outcome can be determined based on the selected symbols of a game outcome and a player's win entitlement and a pay table 643 that specifies awards, for example.

At 1030, a modifier may be generated. For example, in certain embodiments, a win outcome is modified by a win outcome modifier if a modification condition (e.g., modification condition 648) is met (e.g., based on a determination by the modifier controller 624). For example, if the outcome generator 622 generates an outcome that includes a designated symbol or symbol combination, a win outcome modifier is generated. In an embodiment, a modifier may be determined each time a win outcome occurs. Modifiers may be, for example, absolute values or multipliers. The modifiers may include modifiers that do not change the win outcome (particularly in embodiments where a modifier is always calculated).

At 1040, a game display is controlled by moving an object relative to a target being displayed. For example, display of the object by display controller 625 is controlled by an object controller which controls the movement of the object based on object data 644 and includes and axis changer 626A—i.e. part of the control is to change the axis of rotation.

At 1050, a win outcome is modified based on the modifier. For example, once the modifier is determined and displayed to the player, the prize outcome and credit data are modified (e.g., the prize evaluator 623 modifies the prize outcome and updates credit data 647).

It will be understood to persons skilled in the art of the invention that many modifications may be made without departing from the spirit and scope of the invention.

It is to be understood that, if any prior art publication is referred to herein, such reference does not constitute an admission that the publication forms a part of the common general knowledge in the art, in Australia or any other country.

In the claims which follow and in the preceding description of the invention, except where the context indicates otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

It will be appreciated by persons skilled in the art that numerous variations and/or modifications may be made to the invention as shown in the specific embodiments and/or aspects without departing from the spirit or scope of the invention as broadly described. The present embodiments and aspects are, therefore, to be considered in all respects as illustrative and not restrictive. Several embodiments are described above with reference to the drawings. These drawings illustrate certain details of specific embodiments that implement the systems and methods and programs of the present invention. However, describing the invention with drawings should not be construed as imposing on the invention any limitations associated with features shown in the drawings. The present invention contemplates methods, systems and program products on any electronic device and/or machine-readable media suitable for accomplishing its operations. Certain embodiments of the present invention may be implemented using an existing computer processor and/or by a special purpose computer processor incorporated for this or another purpose or by a hardwired system, for example.

Embodiments within the scope of the present invention include program products comprising machine-readable media for carrying or having machine-executable instructions or data structures stored thereon. Such machine-readable media can be any available media that can be accessed by a general purpose or special purpose computer or other machine with a processor. By way of example, such machine-readable media may comprise RAM, ROM, PROM, EPROM, EEPROM, Flash, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such a connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

The invention claimed is:

1. A method of gaming comprising:

generating a game outcome;

determining whether the game outcome includes a win outcome;

providing a three-dimensional representation of an object having a plurality of first win outcome modifiers thereon;

controlling display of the object in response to a modification condition being met, such that the object is displayed as rotating and translating behind a screen having a plurality of targets that are each associated with a second win outcome modifier, wherein the axis around which the object rotates changes at least once prior to the object stopping and wherein the object translates randomly from target to target and, stops at one of the plurality of targets such that, after stopping, a selected first win outcome modifier of the plurality of first win outcome modifiers is apparent from the display;

combining the selected first win outcome modifier with the second win outcome modifier associated with the target at which the object stopped such that said first win outcome modifier has the effect of at least one of:

a) adding to the second win outcome modifier associated with the target at which the object stopped;

b) negating the second win outcome modifier associated with the target at which the object stopped; and c) having no effect on the second win outcome modifier associated with the target at which the object stopped; and modifying the win outcome with the combined modifier.

2. A method as claimed in claim 1, wherein the object is spherical.

3. A method as claimed in claim 1, wherein the first win outcome modifiers correspond to respective ones of a plurality of regions of the surface of the object.

4. A method as claimed in claim 3, wherein the sizes of the regions are related to the values of the modifiers.

5. A method as claimed in claim 1, wherein the axis of rotation changes a plurality of times.

6. A method as claimed in claim 1, wherein a direction of rotation of the object changes at least once.

7. A method as claimed in claim 1, further comprising displaying the object as translating relative to the display.

8. A method as claimed in claim 7, wherein the object translates by rolling.

9. A method as claimed in claim 7, wherein the path followed by the translating object is randomly determined.

10. A method as claimed in claim 1, comprising determining the stopping position of the object randomly by employing a random number generator and a probability table.

11. A game controller for a gaming system, the game controller arranged to:

generate a game outcome;

determine whether the game outcome includes a win outcome;

control display on a display of a three-dimensional representation of an object having a plurality of first win outcome modifiers thereon in response to a modification condition being met, such that the object is displayed as rotating and translating behind a screen having a plurality of targets that are each associated with a second win outcome modifier, wherein the axis of rotation around which the object rotates changes at least once prior to the object stopping and such that after stopping and wherein the object translates randomly from target to target and, stops at one of the plurality of targets such that, after stopping, a selected first win outcome modifier of the plurality of first win outcome modifiers is apparent from the display of the object;

combine the selected first win outcome modifier with the second win outcome modifier associated with the target at which the object stopped such that said first win outcome modifier has the effect of at least one of:

a) add to the second win outcome modifier associated with the target at which the object stopped;

b) negate the second win outcome modifier associated with the target at which the object stopped; and c) have no effect on the second win outcome modifier associated with the target at which the object stopped; and modify the win outcome with the combined modifier.

12. A game controller as claimed in claim 11, comprising a modifier controller arranged to select the first win outcome modifier which is to be applied.

13. A game controller as claimed in claim 11 comprising a processor and a memory storing program code which when executed implements the functions of generating an outcome, determining whether the outcome comprises a winning outcome, controlling display of the object and modifying the win outcome.

14. A gaming system comprising:

a display; and a game controller arranged to:

generate a game outcome;

determine whether the game outcome includes a win outcome;

control display on the display of a three-dimensional representation of an object having a plurality of first win outcome modifiers thereon in response to a modification condition being met, such that the object is displayed as rotating and translating behind a screen having a plurality of targets that are each associated with a second win outcome modifier, wherein the axis of rotation around which the object rotates changes at least once prior to the object stopping and wherein the object translates randomly from target to target and, stops at one of the plurality of targets such that after stopping, a selected first win outcome modifier of the plurality of first win outcome modifiers is apparent from the display of the object;

combine the selected first win outcome modifier with the second win outcome modifier associated with the target at which the object stopped such that said first win outcome modifier has the effect of at least one of:

a) add to the second win outcome modifier associated with the target at which the object stopped;

b) negate the second win outcome modifier associated with the target at which the object stopped; and c) have no effect on the second win outcome modifier associated with the target at which the object stopped; and modify the win outcome with the combined modifier.

15. A method of gaming comprising:

generating a game outcome;

determining whether the game outcome includes a win outcome;

providing a three-dimensional representation of an object having a plurality of first win outcome modifiers thereon and representation of a plurality of targets, each target associated visually with a second win outcome modifier;

controlling display of the object in response to a modification condition being met, such that the object is displayed as moving relative to the targets and stopping at one of the targets, wherein the object translates randomly from target to target and, stops at one of the plurality of targets such that after stopping, a composite modifier, formed by a combination a first win outcome modifier of the object at the stop position and a second win outcome modifier of the target at which the object stopped, is apparent from the display, wherein the composite modifier is formed by combining the first win outcome modifier at the stop position with the second win outcome modifier associated with the target at which the object stopped such that said first win outcome modifier has the effect of at least one of:

a) adding to the second win outcome modifier associated with the target at which the object stopped;

b) negating the second win outcome modifier associated with the target at which the object stopped; and c) having no effect on the second win outcome modifier associated with the target at which the object stopped; and modifying the win outcome with the composite modifier.

16. A game controller for a gaming system, the game controller arranged to:

generate a game outcome;

determine whether the game outcome includes a win outcome;

control display on a display of a three-dimensional representation of an object having a plurality of first win outcome modifiers thereon in response to a modification condition being met, such that the object is displayed as moving relative to the targets and stopping at one of the targets, wherein the object translates randomly from target to target and, stops at one of the plurality of targets such that after stopping, a composite modifier, formed by a combination of a first win outcome modifier of the object at the stop position and a second win outcome modifier of the target at which the object stopped, is apparent from the display, wherein the composite modifier is formed by combining the first win outcome modifier at the stop position with the second win outcome modifier associated with the target at which the object stopped such that said first win outcome modifier has the effect of at least one of:

a) add to the second win outcome modifier associated with the target at which the object stopped;

b) negate the second win outcome modifier associated with the target at which the object stopped; and c) have no effect on the second win outcome modifier associated with the target at which the object stopped; and modify the win outcome with the composite modifier.

17. A gaming system comprising:

a display; and a game controller arranged to:

generate a game outcome;

determine whether the game outcome includes a win outcome;

control display on the display of a three-dimensional representation of an object having a plurality of win outcome modifiers thereon in response to a modification condition being met, wherein the object translates randomly from target to target and, stops at one of the plurality of targets such that after stopping, a composite modifier, formed by a combination of a first win outcome modifier of the object at the stop position and a second win outcome modifier of the target at which the object stopped, is apparent from the display, wherein the composite modifier is formed by combining the first win outcome modifier at the stop position with the second win outcome modifier associated with the target at which the object stopped such that said first win outcome modifier has the effect of at least one of:

a) add to the second win outcome modifier associated with the target at which the object stopped;

b) negate the second win outcome modifier associated with the target at which the object stopped; and c) have no effect on the second win outcome modifier associated with the target at which the object stopped; and modify the win outcome with the composite modifier.

18. A non-transitory computer readable medium including computer program code which when executed implements a method of gaming comprising:

generating a game outcome;

determining whether the game outcome includes a win outcome;

providing a three-dimensional representation of an object having a plurality of first win outcome modifiers thereon;

controlling display of the object in response to a modification condition being met, such that the object is displayed as rotating and translating behind a screen having a plurality of targets that are each associated with a second win outcome modifier, wherein the axis around which the object rotates changes at least once prior to the object stopping and wherein the object translates randomly from target to target and, stops at one of the plurality of targets such that, after stopping, a selected first win outcome modifier of the plurality of first win outcome modifiers is apparent from the display;

combining the selected first win outcome modifier with the second win outcome modifier associated with the target at which the object stopped such that said first win outcome modifier has the effect of at least one of:

a) adding to the second win outcome modifier associated with the target at which the object stopped;

b) negating the second win outcome modifier associated with the target at which the object stopped; and c) having no effect on the second win outcome modifier associated with the target at which the object stopped; and modifying the win outcome with the combined modifier.

* * * * *

UNITED STATES PATENT AND TRADEMARK OFFICE

CERTIFICATE OF CORRECTION

PATENT NO. : 9,011,245 B2
APPLICATION NO. : 13/617955
DATED : April 21, 2015
INVENTOR(S) : Antoon Christiaan Visser It is certified that error appears in the above-identified patent and that said Letters Patent is hereby corrected as shown below:

In the Claims

Column 14, line 55 (claim 15), between the word “combination” and “a” insert -- of --.

Signed and Sealed this
Twenty-second Day of September, 2015

Michelle K. Lee
*Director of the United States Patent and Trademark Office*